G. A. UNGAR.
FLEXIBLE COUPLING.
APPLICATION FILED JULY 23, 1920.
1,422,638.
Patented July 11, 1922.
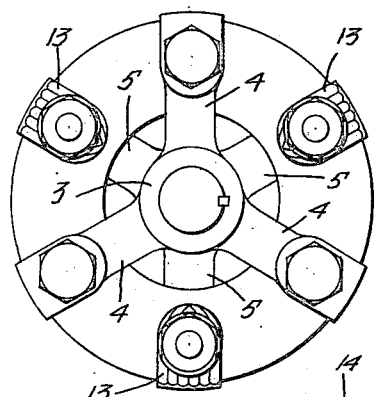
Fig. 1
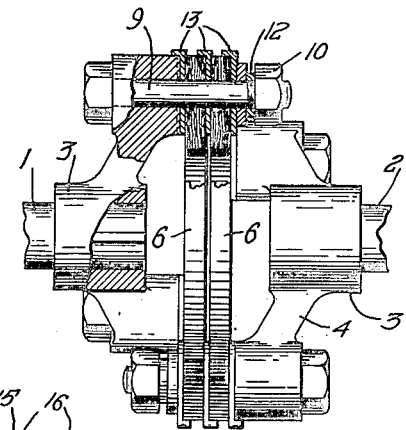
Fig. 2
Fig. 4
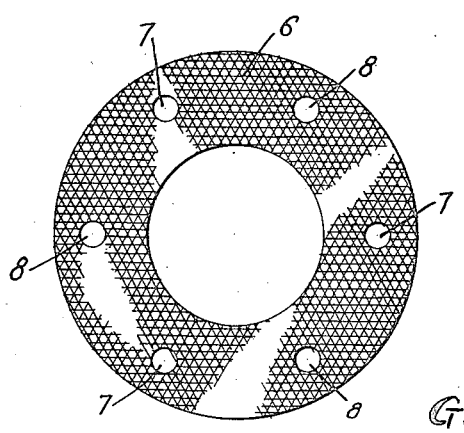
Fig. 3
INVENTOR
G. A. Ungar,
BY
Dull, Warfield & Dull
ATTORNEY

UNITED STATES PATENT OFFICE.

GUSTAV A. UNGAR, OF PELHAM MANOR, NEW YORK.

FLEXIBLE COUPLING.

1,422,638.  Specification of Letters Patent.  Patented July 11, 1922.

Application filed July 23, 1920. Serial No. 398,401.

*To all whom it may concern:*

Be it known that I, GUSTAV A. UNGAR, a citizen of the United States, residing at Pelham Manor, in the county of Westchester and State of New York, have invented certain new and useful Improvements in Flexible Couplings, of which the following is a full, clear, and exact description, such as will enable other skilled in the art to which it appertains to make and use the same.

This invention relates to joints, and with respect to its more specific features to flexible couplings embodying flexible fabric disks adapted especially for use for the transmission of torque.

One of the objects of the invention is the provision of a flexible disk-like member of great strength and resistance to buckling adapted for use as a coupling member and having substantially uniform flexibility in three principal directions. The joint finds a special utility in coupling the members of a power-shaft. It permits angular movement between the axes of such members without impairing the transmission of torque.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, forming part of this specification and wherein similar reference characters refer to similar parts throughout the several views,—

Figure 1 is an end elevation of two rotary power members flexibly connected in accordance with the present invention;

Fig. 2 is a side elevation of Fig. 1, partly in section;

Fig. 3 is an end elevation of one of the disks of Figs. 1 and 2, but disclosing the arrangement of threads; and Fig. 4 is a diagrammatic view of a portion of one of the disks, illustrating the arrangement of the threads, or strands, relative to each other and to the bolt openings.

Referring now more specifically to the drawings, the numeral 1 indicates a driving member and the numeral 2 a driven member, in the present instance each member being a rotary shaft. Keyed on the members are the spiders having the hubs 3 and three arms 4 and 5 symmetrically disposed around the axes of rotation at angles of 60° relative to each other. The numerals 4 indicate the arms of one spider and the numerals 5 those of the other.

The numerals 6 indicate two flexible joint members or disk-like members, one of which is indicated in end view in Fig. 3. As will be noted, it has a series of bolt openings, in the present instance six bolt openings, three being indicated by the numerals 7 and three by the numerals 8, the bolt openings 7 being utilized for attaching the disk to the arms of one spider, and the openings 8 being utilized for attaching the disk to the arms of the other spider. The disks are connected to each spider arm by a similar construction including a bolt 9 which passes through the spider arm and the bolt openings in the disks 6, a nut 10 and washers 11 and 12 being employed to clamp the parts together. Clamping plates or buckle plates 13 are interposed between the disks and are disposed on the outer faces of each disk to assist in clamping the disks in position. In the embodiment illustrated, the clamping plates are radially corrugated on both faces so as to firmly and positively grip the disks 6.

The disks 6 are each formed of a plurality of layers of fabric secured together and forming a single flat ring or disk, two of which rings or disks are indicated by the numeral 6 in Fig. 2. The layers may be composed of rubberized canvas and secured together by pressure and vulcanization. In the present embodiment each layer includes three sets of strands interwoven with each other, one set of strands being indicated by the numerals 14; another set being indicated by the numerals 15, and another set by the numerals 16, the strands of the sets being arranged at angles of approximately 60°, and similar sets of strands of the several layers of a disk being parallel to each other so that throughout a disk the strands 14 of the several layers are parallel to each other, the strands 15 are parallel to each other, and the strands 16 are parallel to each other. The relative arrangement of the strands is clearly shown in Fig. 4. Referring to Fig. 4 it will be observed that one set of strands, namely, the strands 14, extends in practically straight lines parallel to the lines joining the bolt openings 7 for one spider and the bolt openings 8 for the other spider. The result of this is that whichever be the direction in which rotation takes place and whichever spider be the driving spider, one set of strands will be disposed parallel to the line of pull and be in the most efficient position for taking the strain. Inasmuch as the spiders illustrated in the present embodiment each has three arms, the strain taking strands 14, 15 and 16, when arranged at 60° relative to each other, dispose themselves in direct line with the strain between the arms of one spider and those of the other, when one set is arranged in the direct line.

In case a spider having a greater number of arms than three is employed, the layers of the disks should each be composed of strands so related as to directly take the strain between the arms of the two spiders. In case the spider had four arms there would be eight bolt openings and an octagonal arrangement of the strands would result, the direction of the strands between the arm of one spider and the arm of another being parallel to the line of pull between such arms. Under such circumstances each layer would be made of four interwoven strands instead of three, as will be understood.

In the associated arrangement of spiders and disks disclosed, it will be observed that the arms 4 of one spider alternate with the arms 5 of the other around the rotary axis, and that by reason of the provision of three or more arms on each spider symmetrically arranged around the rotary axis, the strands of the several layers, in order to be in the direct line of strain between the arms of one spider and those of the other, should be placed at angles of less than 180° relative to each other and parallel to the lines of pull between the driving and the driven arm.

By constructing a coupling disk as above described, the strength of the disk is greatly increased as is also the resistance to buckling. Furthermore uniform flexibility in three principal directions is attained.

Thus by the above described construction is accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent, is:—

1. A flexible joint member comprising a plurality of layers of fabric secured together and forming a single flat ring or disk-like member, each of said layers including three sets of strands interwoven with each other, the sets of strands arranged at angles of approximately 60° or less relative to each other.

2. A flexible joint member comprising a plurality of layers of fabric secured together and forming a single flat ring or disk-like member, each of said layers including three sets of strands interwoven with each other, the sets of strands arranged at angles of approximately 60° or less relative to each other, the sets of strands of each layer being parallel respectively to those of the other layers.

3. A device of the character described comprising, in combination, a driving and a driven member, each including a spider having arms symmetrically disposed around the axis of rotation at angles of less than 180° relative to each other, the arms of one spider alternating with those of the other around said axis, and a flexible torque transmitting element attached to each of said arms, said flexible element comprising a plurality of layers of fabric secured together and forming a single flat ring or disk-like member, each of said layers composed of three sets of strands interwoven with each other, the sets of strands arranged at angles of less than 180° relative to each other and parallel to the lines of pull between the arms of one spider and those of the other, respectively.

4. A flexible joint member comprising a plurality of layers of fabric secured together and forming a single flat ring or disk-like member having a series of bolt openings, each of said layers including three sets of strands interwoven with each other, said sets of strands, respectively, lying parallel to the lines joining successive bolt openings.

In testimony whereof I affix my signature, in the presence of two witnesses.

GUSTAV A. UNGAR.

Witnesses:
H. M. SEAMANS,
J. W. ANDERSON.